US012722429B2

(12) United States Patent
Kouno et al.

(10) Patent No.: US 12,722,429 B2
(45) Date of Patent: Sep. 1, 2026

(54) SOUND ABSORBING TOOL AND ASSEMBLY

(71) Applicant: BRIDGESTONE CORPORATION, Tokyo (JP)

(72) Inventors: Yoshihide Kouno, Tokyo (JP); Akira Kobayakawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 231 days.

(21) Appl. No.: 18/711,878

(22) PCT Filed: Oct. 3, 2022

(86) PCT No.: PCT/JP2022/037018
§ 371 (c)(1),
(2) Date: May 21, 2024

(87) PCT Pub. No.: WO2023/112434
PCT Pub. Date: Jun. 22, 2023

(65) Prior Publication Data

US 2025/0018751 A1 Jan. 16, 2025

(30) Foreign Application Priority Data

Dec. 13, 2021 (JP) ................................ 2021-202055

(51) Int. Cl.
*B60C 19/00* (2006.01)
*B60B 21/12* (2006.01)

(52) U.S. Cl.
CPC ............ *B60C 19/002* (2013.01); *B60B 21/12* (2013.01)

(58) Field of Classification Search
CPC ....... B60C 19/002; B60C 17/04; B60C 17/06; B60C 17/065; B60B 21/12
See application file for complete search history.

(56) References Cited

U.S. PATENT DOCUMENTS 6,244,314 B1 * 6/2001 Dodt ..................... B60C 19/002 152/158
6,598,636 B1 * 7/2003 Schurmann ........... B60C 19/002 152/157
8,196,628 B2 6/2012 Fowler-Hawkins
2001/0015249 A1 8/2001 Mohr
(Continued)

FOREIGN PATENT DOCUMENTS

DE 4400912 A1 7/1995
DE 19926039 A1 * 12/2000 ............. B60B 21/12
EP 2907678 B1 * 9/2016 ........... B60C 19/002
(Continued)

OTHER PUBLICATIONS

Dec. 20, 2022, International Search Report issued in the International Patent Application No. PCT/JP2022/037018.
(Continued)

*Primary Examiner* — Jason R Bellinger
*Assistant Examiner* — Taekwon Choi
(74) *Attorney, Agent, or Firm* — KENJA IP LAW PC

(57) ABSTRACT

A sound absorbing tool according to this disclosure includes: an endless housing body that internally defines a housing space and is stretchable in a circumferential direction; and a shapeless sound absorbing material that is housed in the housing space of the housing body.

15 Claims, 10 Drawing Sheets

(56) References Cited

U.S. PATENT DOCUMENTS

| | | | |
|---|---|---|---|
| 2010/0071820 | A1 | 3/2010 | Noggle et al. |

FOREIGN PATENT DOCUMENTS

| | | | | | |
|---|---|---|---|---|---|
| JP | H06106903 | A | | 4/1994 | |
| JP | H07266802 | A | | 10/1995 | |
| JP | H0986102 | A | | 3/1997 | |
| JP | H0986112 | A | | 3/1997 | |
| JP | H0986113 | A | | 3/1997 | |
| JP | 2002512913 | A | | 5/2002 | |
| JP | 2004291905 | A | | 10/2004 | |
| JP | 2006341681 | A | | 12/2006 | |
| JP | 2011006063 | A | | 1/2011 | |
| JP | 2011057006 | A | * | 3/2011 | ............. B60B 21/12 |
| KR | 100777754 | B1 | * | 11/2007 | ........... B60C 19/002 |

OTHER PUBLICATIONS

Jun. 13, 2024, International Preliminary Report on Patentability issued in the International Patent Application No. PCT/JP2022/037018.

Feb. 20, 2025, search result of the Extended European Search Report issued by the European Patent Office in the corresponding European Patent Application No. 22906969.5.

* cited by examiner

SOUND ABSORBING TOOL AND ASSEMBLY

TECHNICAL FIELD

This disclosure relates to a sound absorbing tool and an assembly.

BACKGROUND

Conventionally, there is known a technique of arranging a sound absorbing material formed of a foam body in a tire lumen between a rim of a wheel in a vehicle and a tire. This technique can cause the sound absorbing material to reduce resonance sound that is generated in the tire lumen. PTL 1 discloses a sound absorbing tool including this kind of sound absorbing material formed of a foam body.

The sound absorbing tool disclosed in PTL 1 includes a band-shaped backplane formed of a stainless plate. The backplane in PTL 1 has locking portions at both ends. The sound absorbing tool disclosed in PTL 1 is wound along a tire locking ring groove of a wheel, and the locking portions at both ends of the backplane are connected and fixed one another. This attaches the sound absorbing tool disclosed in PTL 1 to the wheel.

CITATION LIST

Patent Literature

PTL 1: JPH09-86102A

SUMMARY

Technical Problem

However, in the sound absorbing tool disclosed in PTL 1, the backplane formed of a stainless plate has high rigidity, and the centrifugal force or the like during vehicle running is thus likely to increase the load on the locking portions. Therefore, there is a problem that the locking portions of the backplane are likely to break during vehicle running.

It could be helpful to provide a sound absorbing tool that can increase the durability during vehicle running, and an assembly.

Solution to Problem

A sound absorbing tool as a first aspect of this disclosure includes: an endless housing body that internally defines a housing space and is stretchable in a circumferential direction; and a shapeless sound absorbing material that is housed in the housing space of the housing body.

An assembly as a second aspect of this disclosure includes a rim and a tire mounted on the rim, and the assembly includes the above sound absorbing tool that is supported by the rim on an annular outer surface of the rim, inside the tire.

Advantageous Effect

This disclosure can provide a sound absorbing tool that can increase the durability during vehicle running, and an assembly.

BRIEF DESCRIPTION OF THE DRAWINGS

In the accompanying drawings:

FIG. 3 is a cross-sectional view at the position of a line II-II in FIG. 2;

DETAILED DESCRIPTION

Embodiments of a sound absorbing tool and an assembly according to this disclosure will be exemplified and described hereinafter with reference to the drawings. Configurations common between the figures have the same reference signs.

Figure 1:
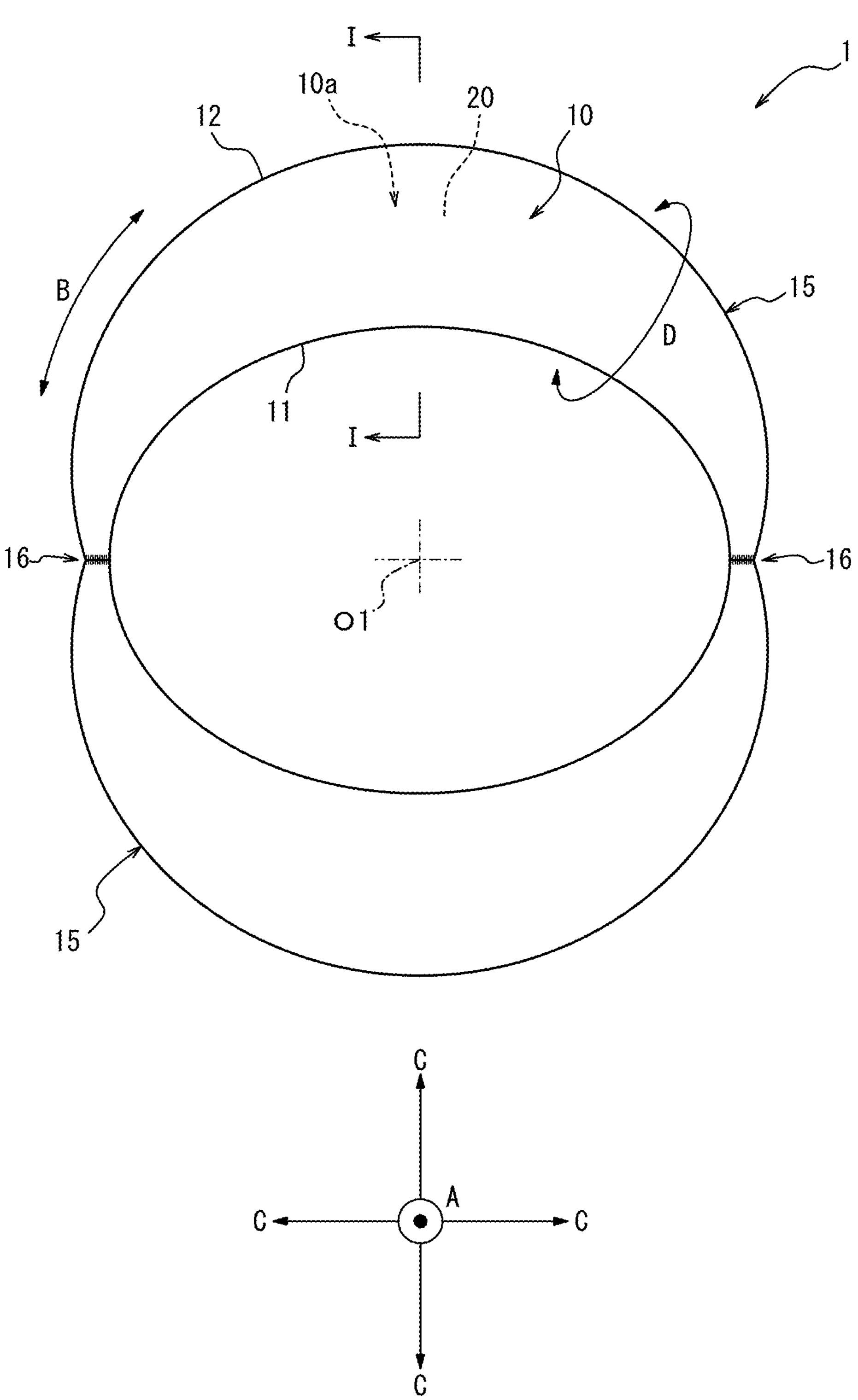
FIG. 1 is a front view of a sound absorbing tool as one of the disclosed embodiments.
Figure 2:
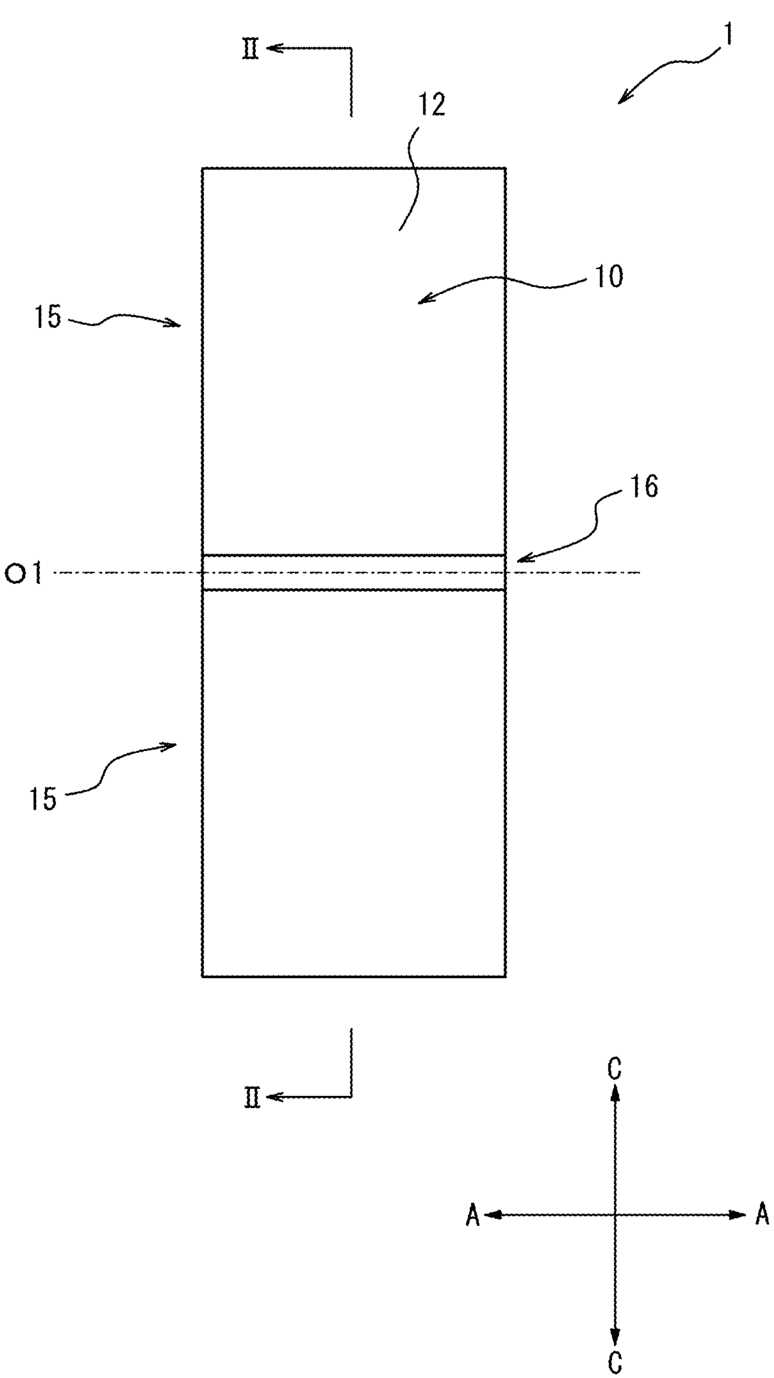
FIG. 2 is a side view of the sound absorbing tool illustrated in FIG. 1.
Figure 3:
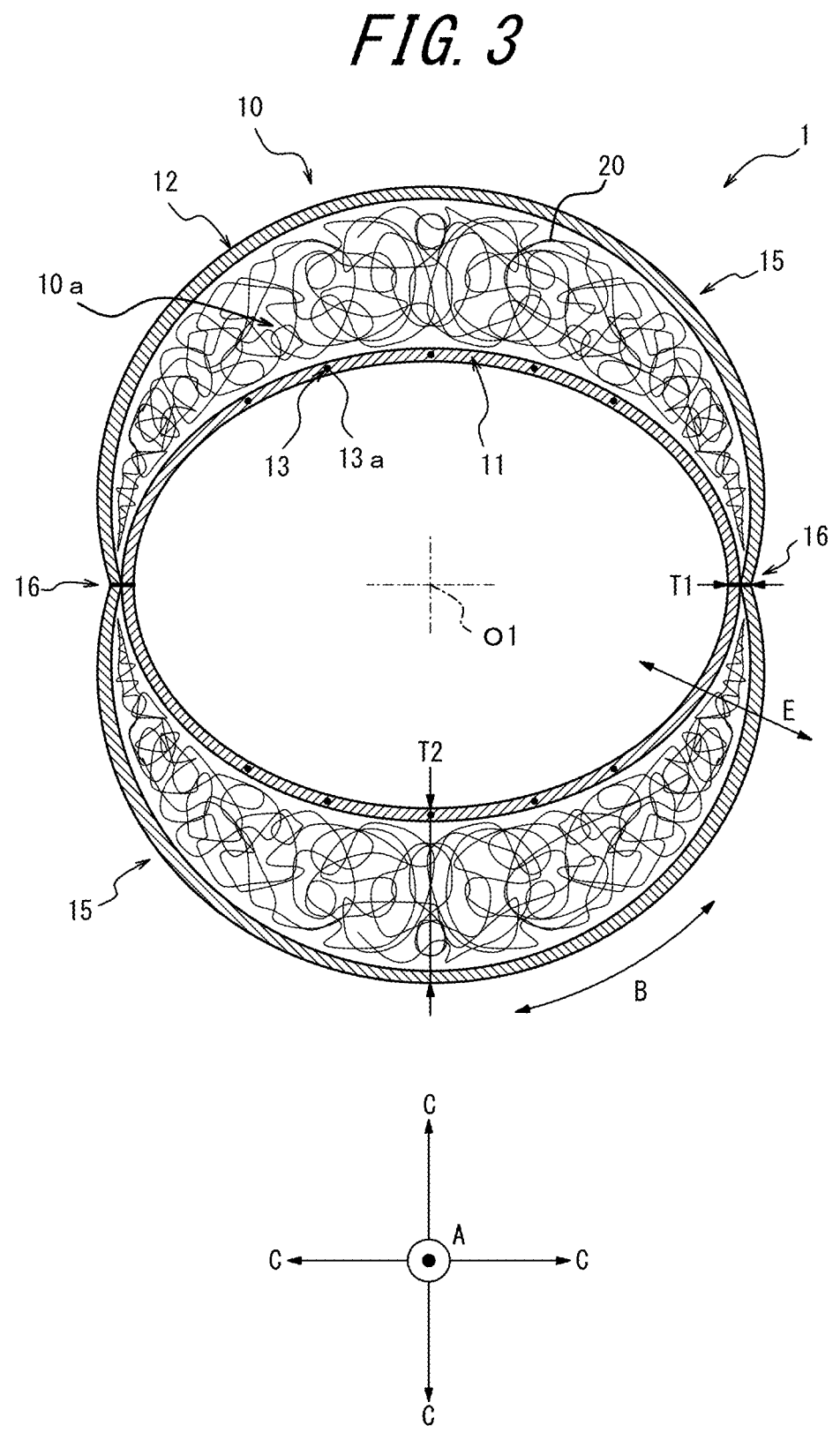
Figure 4:
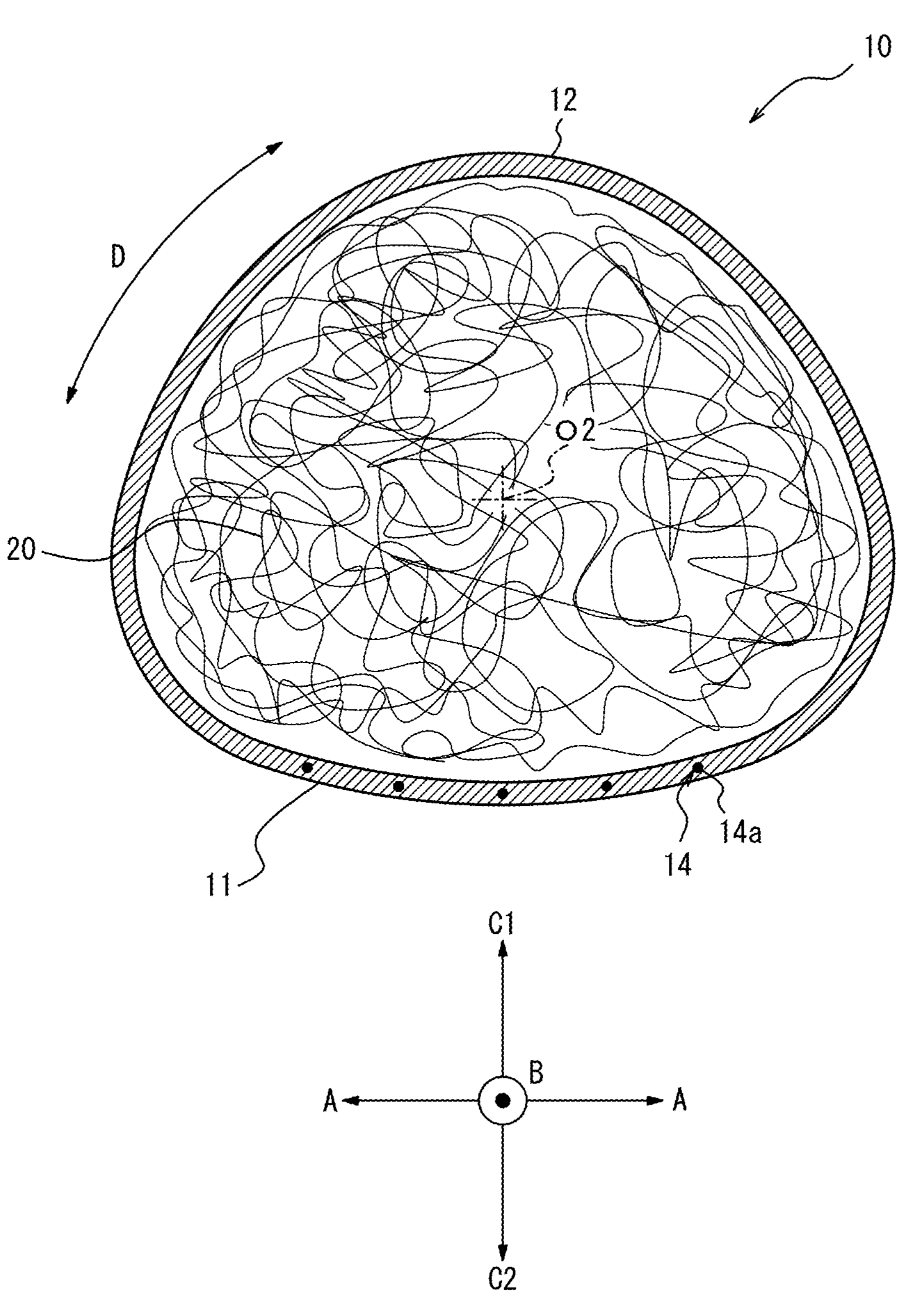
FIG. 4 is a cross-sectional view at the position of a line I-I in FIG. 1.

FIG. 1 is a front view of a sound absorbing tool 1 as one of the disclosed embodiments of the sound absorbing tool according to this disclosure. FIG. 2 is a side view of the sound absorbing tool 1. FIG. 3 is a cross-sectional view of the sound absorbing tool 1 at the position of a line II-II in FIG. 2. FIG. 4 is a cross-sectional view of the sound absorbing tool 1 at the position of a line I-I in FIG. 1.

The details are described later, but the sound absorbing tool 1 is placed on an annular outer surface of a rim. The use of the sound absorbing tool 1 can reduce resonance sound that is generated in a tire lumen during vehicle running.

As illustrated in FIG. 1 to FIG. 4, the sound absorbing tool 1 includes an endless housing body 10 and a sound absorbing material 20.

Hereinafter, for the sake of explanation, when a central axis O1 (see FIG. 1, etc.) that penetrates a central opening of the endless housing body 10 is set, a direction parallel to the central axis O1 is simply referred to as a "width direction A". Moreover, a direction around the central axis O1 is referred to as a "first circumferential direction B". That is, the first circumferential direction B means an extending direction in which the housing body 10 endlessly extends. Furthermore, a radial direction of a circle around the central axis O1 is referred to as a "radial direction C". Of the radial direction C, a direction remote from the central axis O1 is referred to as an "outside C1 in the radial direction C", and a direction approaching the central axis O1 is referred to as an "inside C2 in the radial direction C". Moreover, when an endless axis O2 (see FIG. 4) along the first circumferential direction B is set, a direction around the endless axis O2 is referred to as a "second circumferential direction D".

The endless housing body 10 is configured to be stretchable in the first circumferential direction B. Therefore, the housing body 10 changes in length in the first circumferential direction by stretching in the first circumferential direction B. The housing body 10 internally defines a housing space 10*a* that can house the sound absorbing material 20.

The sound absorbing material 20 is shapeless. The details are described later, but the shapeless sound absorbing material 20 may be, for example, a small piece group formed of a plurality of linear or granular small pieces. The sound absorbing material 20 is housed in the housing space 10*a* of the housing body 10. That is, the sound absorbing material 20 is housed in the housing space 10*a* inside the housing body 10 to be held in the housing body 10 in an outer shape tailored to the housing space 10*a*. In other words, the outer shape of the sound absorbing material 20 housed in the housing space 10*a* of the housing body 10 is deformable following the change of form of the housing body 10.

According to such a sound absorbing tool 1, the centrifugal force during vehicle running makes the housing body 10 be likely to elongate and deform in the first circumferential direction B. The sound absorbing material 20 housed in the housing space 10*a* of the housing body 10 is shapeless and thus can deform following the change of form of the housing body 10 that elongates in the first circumferential direction B, which is difficult to inhibit the elongation deformation of the housing body 10. Therefore, according to the sound absorbing tool 1, the housing body 10 elongates and deforms in the first circumferential direction B with respect to the centrifugal force during vehicle running, which can absorb the load applied on the sound absorbing tool 1. This can increase the durability during vehicle running of the sound absorbing tool 1.

Hereinafter, further details of the sound absorbing tool 1 of this embodiment will be described.

<Housing Body 10>

As illustrated in FIG. 1 and FIG. 3, the housing body 10 of this embodiment includes: a housing portion 15 that defines the housing space 10*a* housing the sound absorbing material 20; and a connecting portion 16 that defines no housing space 10*a*, in the first circumferential direction B.

The housing portion 15 includes: an inner wall 11 located at the inside C2 in the radial direction C across the housing space 10*a*; and an outer wall 12 located at the outside C1 in the radial direction C across the housing space 10*a*.

The connecting portion 16 connects the ends in the first circumferential direction B of the housing portion 15. As illustrated in FIG. 1 and FIG. 3, the housing body 10 of this embodiment includes a plurality of (two in this embodiment) housing portions 15 and a plurality of (two in this embodiment) connecting portions 16 located between the plurality of housing portions 15, in the first circumferential direction B. Each connecting portion 16 of this embodiment connects the ends of two housing portions 15 adjacent in the first circumferential direction B. However, the housing body 10 may be configured to include only one housing portion 15 in the first circumferential direction B. In such a case, the connecting portion 16 may connect both ends of only one housing portion 15.

The housing body 10 of this embodiment may be formed by, for example, crashing a part in the first circumferential direction B of an endless tube material in the radial direction C to be bonded. In such a case, the part crushed in the radial direction C and bonded of the endless tube material forms the above connecting portion 16. Moreover, in the first circumferential direction B, the part other than the connecting portion 16 forms the housing portion 15 that defines the housing space 10*a*. However, the method of forming the housing body 10 is not specifically limited. The housing body 10 may be obtained by, for example, connecting a plurality of bag bodies that form the respective housing portions 15 in the first circumferential direction B to be endless. In such a case, the part at which two bag bodies are connected to one another forms the above connecting portion 16.

In the housing body 10 of this embodiment, the inner wall 11 and the outer wall 12 have different stretchabilities in the first circumferential direction B. Specifically, the inner wall 11 of the housing body 10 has lower stretchability in the first circumferential direction B than the outer wall 12 of the housing body 10. The stretchability here refers to an elongation percentage (%) obtained by an elongation percentage test based on Method B of the fabric test method for a woven fabric and a knitted fabric in JIS L 1096.

The inner wall 11 of the housing body 10 is a part arranged on an annular outer surface side of a rim, in a state where the sound absorbing tool 1 is placed on the annular outer surface of the rim. In contrast, the outer wall 12 of the housing body 10 is a part arranged on the side opposite to the annular outer surface side of the rim, in a state where the sound absorbing tool 1 is placed on the annular outer surface of the rim.

By decreasing the stretchability in the first circumferential direction B of the inner wall 11, the centrifugal force during vehicle running makes the inner wall 11 be less likely to excessively elongate in the first circumferential direction B. This can restrain the sound absorbing tool 1 from coming away from the rim. Conversely, by increasing the stretchability in the first circumferential direction B of the outer wall 12, the centrifugal force during vehicle running makes the outer wall 12 be likely to elongate in the first circumferential direction B, which can absorb the load applied on the sound absorbing tool 1. That is, by making the stretchabilities in the first circumferential direction B of the inner wall 11 and the outer wall 12 have the above relation, in addition to the increase in durability of the sound absorbing tool 1 based on the above load absorption performance by the sound absorbing tool 1, the placement stability to the rim of the sound absorbing tool 1 can be increased.

Moreover, the housing body 10 of this embodiment is stretchable in the second circumferential direction D. With such a configuration, the housing body 10 is likely to elongate and deform in the second circumferential direction D due to the centrifugal force during vehicle running. Therefore, the housing body 10 can absorb the load applied on the sound absorbing tool 1 by elongating and deforming in the second circumferential direction D. This can more increase the durability during vehicle running of the sound absorbing tool 1.

Furthermore, the housing body 10 elongating in the second circumferential direction D can expand the housing space 10*a* housing the sound absorbing material 20 to increase the sound absorbing performance during vehicle running by the sound absorbing material 20. This will be described below in detail (see FIG. 7A and FIG. 7B).

More specifically, in the housing body 10 of this embodiment, the inner wall 11 and the outer wall 12 have different stretchabilities in the second circumferential direction D. The inner wall 11 of the housing body 10 has lower stretchability in the second circumferential direction D than the outer wall 12 of the housing body 10. The stretchability here refers to an elongation percentage (%) obtained by an elongation percentage test based on Method B of the fabric test method for a woven fabric and a knitted fabric in JIS L 1096.

By decreasing the stretchability in the second circumferential direction D of the inner wall 11, the centrifugal force during vehicle running makes the inner wall 11 be less likely to excessively elongate in the second circumferential direction D. This can restrain the inner wall 11 of the housing body 10 from protruding to be convex toward the annular outer surface of the rim (downward in FIG. 4) in a cross-sectional view orthogonal to the first circumferential direction B (see FIG. 4). Therefore, the inner wall 11 of the housing body 10 becomes likely to maintain the shape along the annular outer surface of the rim. Conversely, by increasing the stretchability in the second circumferential direction D of the outer wall 12, the centrifugal force during vehicle running makes the outer wall 12 be likely to elongate in the second circumferential direction D, which can absorb the load applied on the sound absorbing tool 1. That is, by making the stretchabilities in the second circumferential direction D of the inner wall 11 and the outer wall 12 have the above relation, in addition to the increase in durability of the sound absorbing tool 1 based on the above load absorption performance by the sound absorbing tool 1, the placement stability to the rim of the sound absorbing tool 1 can be increased.

The housing body 10 of this embodiment is a woven fabric or a knitted fabric form of fibers such as polyethylene terephthalate fibers. The fibers that form the housing body 10 are not limited to the polyethylene terephthalate fibers and may be other resin fibers. The housing body 10 is not limited to a woven fabric or a knitted fabric so long as it has a configuration having stretchability at least in the first circumferential direction B, and its configuration is not specifically limited. However, as in this embodiment, the housing body 10 is preferably a woven fabric or a knitted fabric. Forming the housing body 10 of a woven fabric or a knitted fabric is likely to achieve desired stretchability in the first circumferential direction B, or in the first circumferential direction B and the second circumferential direction D. Forming the housing body 10 of a woven fabric or a knitted fabric is also likely to ensure the air permeability between the outside of the housing body 10 and the housing space **10*a* housing the sound absorbing material 20**, through gaps between the fibers.

When the housing body 10 is a woven fabric, the extending directions of orthogonal longitudinal fibers and transverse fibers are preferably inclined with respect to the first circumferential direction B and the second circumferential direction D. This can increase the stretchability in the first circumferential direction B and the second circumferential direction D even if the housing body 10 is a woven fabric.

As described above, in the housing body 10 of this embodiment, the inner wall 11 and the outer wall 12 have different stretchabilities. In the housing body 10 that is a woven fabric or a knitted fabric, the above difference in stretchability may be achieved such that, for example, a part of the housing body 10 includes reinforcing fibers. As illustrated in FIG. 3, the inner wall 11 of the housing body 10 of this embodiment internally includes reinforcing fibers **13*a* as a first inside reinforcing member 13 that extends in the first circumferential direction B. Conversely, the outer wall 12 of the housing body 10 of this embodiment internally include no reinforcing fibers 13*a* that extend in the first circumferential direction B. The reinforcing fibers 13*a* of this embodiment are polyethylene terephthalate fibers but may be formed of another resin material. In this way, only the inner wall 11 including the reinforcing fibers 13*a* may differentiate the stretchabilities in the first circumferential direction B between the inner wall 11 and the outer wall 12 of the housing body 10. The reinforcing fibers 13*a* may be fibers that are stretchable themselves in the extending direction or fibers that are not stretchable themselves in the extending direction. When the reinforcing fibers 13*a* that do not stretch in the extending direction are employed, predetermined stretchability in the longitudinal direction can be achieved such that, for example, the reinforcing fibers 13*a*** are configured to wavily extend in an unloaded state.

The difference in stretchability in the first circumferential direction B in the inner wall 11 and the outer wall 12 of the housing body 10 is not limited to the difference in presence or absence of the above reinforcing fibers **13*a*. For example, the difference in stretchability in the first circumferential direction B of the inner wall 11 and the outer wall 12 may be achieved by providing the reinforcing fibers 13*a* also in the outer wall 12 to differentiate the number of the reinforcing fibers 13*a* between the inner wall 11 and the outer wall 12. Moreover, to differentiate the stretchability in the first circumferential direction B between the inner wall 11 and the outer wall 12 of the housing body 10, the first inside reinforcing member 13 having another configuration, such as a reinforcing film, may be used (see FIG. 8). Furthermore, not only the presence or absence of the first inside reinforcing member 13, but also, for example, forming the inner wall 11 and the outer wall 12 of different materials having different stretchabilities may differentiate the stretchability in the first circumferential direction B between the inner wall 11 and the outer wall 12. In this way, the means to achieve the difference in stretchability in the first circumferential direction B between the inner wall 11 and the outer wall 12 of the housing body 10** is not specifically limited.

As illustrated in FIG. 4, the inner wall 11 of the housing body 10 of this embodiment internally includes reinforcing fibers **14*a* as a second inside reinforcing member 14 that extends in the second circumferential direction D. Conversely, the outer wall 12 of the housing body 10 of this embodiment internally includes no reinforcing fibers 14*a* that extend in the second circumferential direction D. The reinforcing fibers 14*a* of this embodiment are polyethylene terephthalate fibers but may be formed of another resin material. In this way, only the inner wall 11 including the reinforcing fibers 14*a* may differentiate the stretchability in the second circumferential direction D between the inner wall 11 and the outer wall 12 of the housing body 10. The reinforcing fibers 14*a* may be fibers that are stretchable themselves in the extending direction or fibers that are not stretchable themselves in the extending direction. When the reinforcing fibers 14*a* that do not stretch in the extending direction are employed, predetermined stretchability in the longitudinal direction can be achieved such that, for example, the reinforcing fibers 14*a*** are configured to wavily extend in an unloaded state.

The difference in stretchability in the second circumferential direction D between the inner wall 11 and the outer wall 12 of the housing body 10 is also not limited to the difference in presence or absence of the above reinforcing fibers **14*a*. For example, the difference in stretchability in the second circumferential direction D between the inner wall 11 and the outer wall 12 may be achieved by providing the reinforcing fibers 14*a* also in the outer wall 12 to differentiate the number of the reinforcing fibers 14*a* between the inner wall 11 and the outer wall 12. Moreover, to differentiate the stretchability in the second circumferential direction D between the inner wall 11 and the outer wall 12 of the housing body 10, the second inside reinforcing member 14 having another configuration, such as a reinforcing film, may be used (see FIG. 8). Furthermore, not only the presence or absence of the second inside reinforcing member 14, but also, for example, forming the inner wall 11 and the outer wall 12 of different materials having different stretchabilities may differentiate the stretchability in the second circumferential direction D between the inner wall 11 and the outer wall 12. In this way, the means to achieve the difference in stretchability in the second circumferential direction D between the inner wall 11 and the outer wall 12 of the housing body 10** is not specifically limited.

As described above, the housing body 10 of this embodiment includes the housing portion 15 and the connecting portion 16 in the first circumferential direction B. In this embodiment, in a state where the sound absorbing material 20 is housed in the housing space 10*a* of the housing portion 15, the bending rigidity in a thickness direction E of the connecting portion 16 is smaller than the bending rigidity in the thickness direction E of the housing portion 15. That is, the connecting portion 16 can easily deform in the thickness direction E, compared with the housing portion 15. Therefore, as in this embodiment, the housing body 10 preferably includes a plurality of connecting portions 16. In particular, as in this embodiment, the plurality of connecting portions 16 preferably include a first connecting portion 16*a* and a second connecting portion 16*b* provided at the positions that are both ends of a flat length L2 of the housing body 10. This facilitates the compactification of the sound absorbing tool 1, which can increase the transportability of the sound absorbing tool 1. This will be described below in detail (see FIG. 6A and FIG. 6B).

<Sound Absorbing Material 20>

As illustrated in FIG. 3 and FIG. 4, the sound absorbing material 20 is housed in the housing space 10*a* of the housing body 10. The sound absorbing material 20 of this embodiment is shapeless stuffing, which is stuffed in the housing space 10*a* of the housing body 10.

The shapeless sound absorbing material 20 is, for example, a small piece group including a plurality of linear or granular small pieces. The sound absorbing material 20 just has to have sound absorbing performance with the entire small piece group. Each of the small pieces is not required to have the sound absorbing performance. The sound absorbing material 20 being a small piece group including a plurality of linear or granular small pieces facilitates the adjustment of the amount of the sound absorbing material 20 housed in the housing space 10*a* of the housing body 10. Examples of the linear small pieces include small pieces of polyester fibers, such as small pieces of polyethylene terephthalate fibers. The outer shape of a cross-sectional surface orthogonal to the longitudinal direction of the linear small piece is not specifically limited. The cross-sectional outer shape of the linear small piece may be, for example, circle, oval, or polygonal. The linear small piece may be a tube body with a hollow portion or a solid body without a hollow portion. Examples of a small piece group formed of the linear small pieces include cotton made of polyester fibers. Examples of the granular small piece include a foam resin small piece such as a urethane foam small piece; and a resin small piece such as a polyethylene pipe small piece. However, the small pieces that form the sound absorbing material 20 are not limited to the above exemplified small pieces.

<<Method of Mounting Sound Absorbing Tool 1 on Rim 100>>

Figure 5:
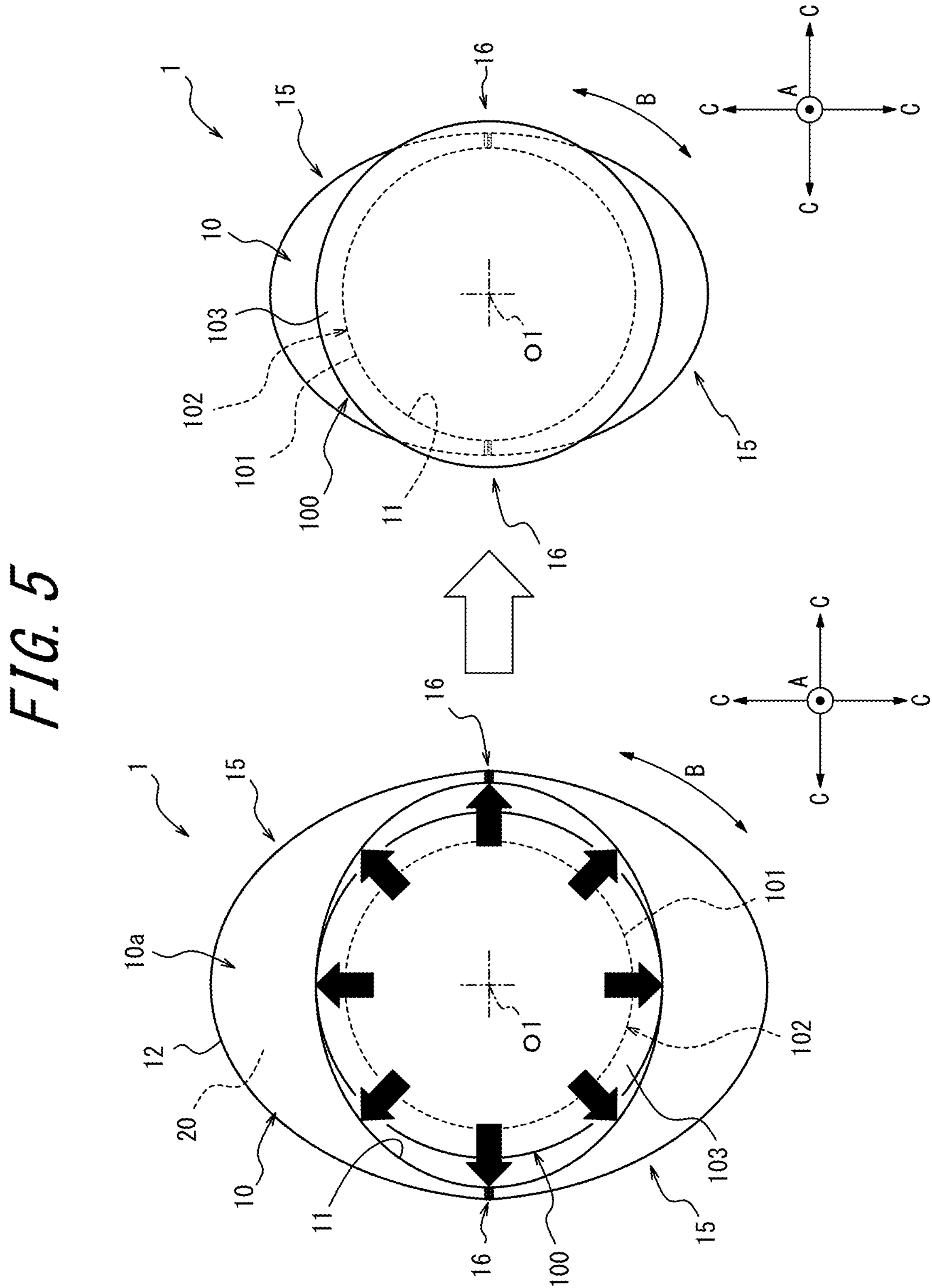
FIG. 5 is an explanatory drawing illustrating a mounting method of mounting the sound absorbing tool illustrated in FIG. 1 on an annular outer surface of a rim.

The following describes a method of mounting the sound absorbing tool 1 of this embodiment on a rim 100, with reference to FIG. 5. FIG. 5 is an explanatory drawing illustrating a mounting method of mounting the sound absorbing tool 1 of this embodiment on an annular outer surface 101 of the rim 100.

As described above, the housing body 10 of the sound absorbing tool 1 is configured to be stretchable in the first circumferential direction B. Moreover, the sound absorbing material 20 housed in the housing space 10*a* of the housing body 10 is shapeless and thus likely to deform following the deformation of the housing body 10. Therefore, as illustrated in FIG. 5, the sound absorbing tool 1 can easily extend the housing body 10 in which the housing space 10*a* houses the sound absorbing material 20, from the inside C2 toward the outside C1 in the radial direction C (see a thick-line arrow in the left figure in FIG. 5).

As illustrated in FIG. 5, the rim 100 includes: an annular portion 102 including the annular outer surface 101; and rim flange portions 103 protruding from both ends of the annular portion 102 to the outside in a rim radial direction. The sound absorbing tool 1 of this embodiment can easily cross over the rim flange portion 103 of the rim 100 by extending the housing body 10 from the inside C2 toward the outside C1 in the radial direction C (see the left figure in FIG. 5). After the sound absorbing tool 1 crosses over the rim flange portion 103, the external force that has been applied to the housing body 10 from the inside C2 toward the outside C1 in the radial direction C is released, which causes the housing body 10 to deform by the restoring force from the outside C1 toward the inside C2 in the radial direction C to be supported on the annular outer surface 101 of the annular portion 102 (see the right figure in FIG. 5).

That is, the sound absorbing tool 1 of this embodiment can be easily placed on the annular outer surface 101 of the rim 100 by using the stretchability in the first circumferential direction B of the housing body 10.

<<Transportability of Sound Absorbing Tool 1>>

Figure 6A:
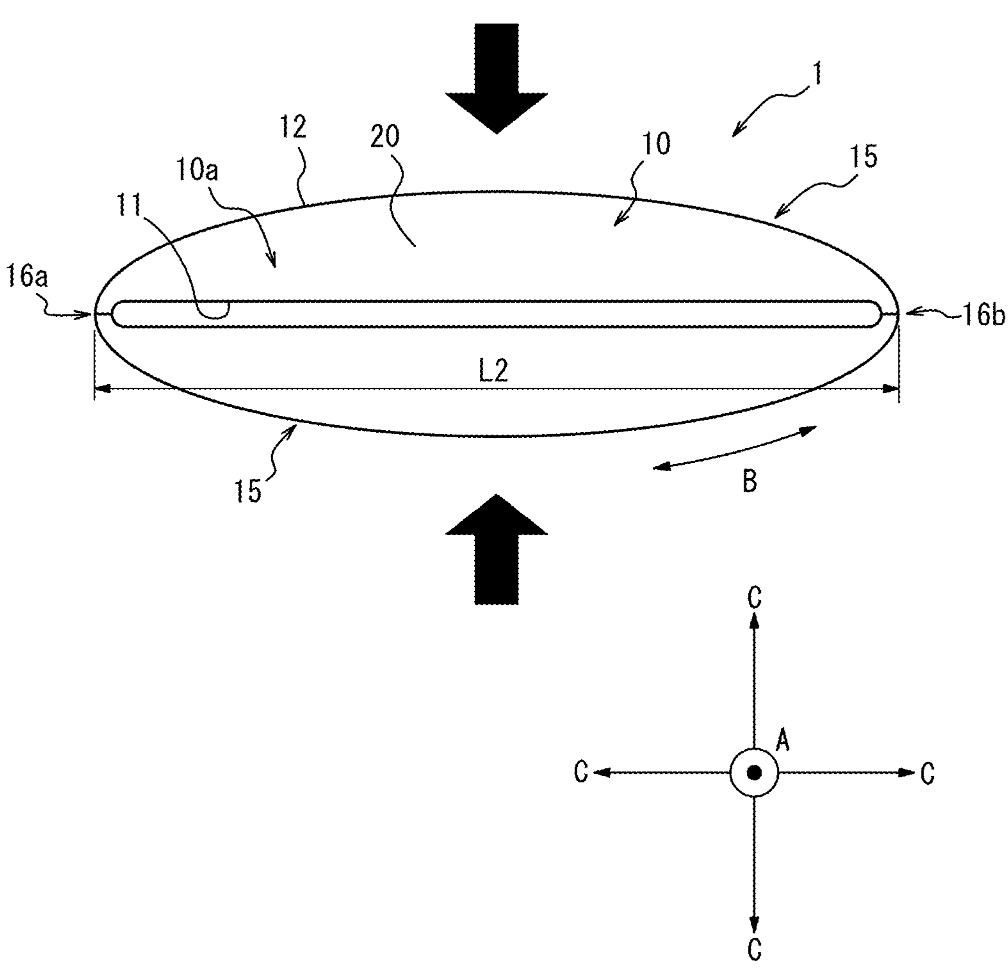
FIG. 6A is a drawing illustrating a state where the sound absorbing tool illustrated in FIG. 1 is folded to be flattened at the positions of connecting portions of a housing body.
Figure 6B:
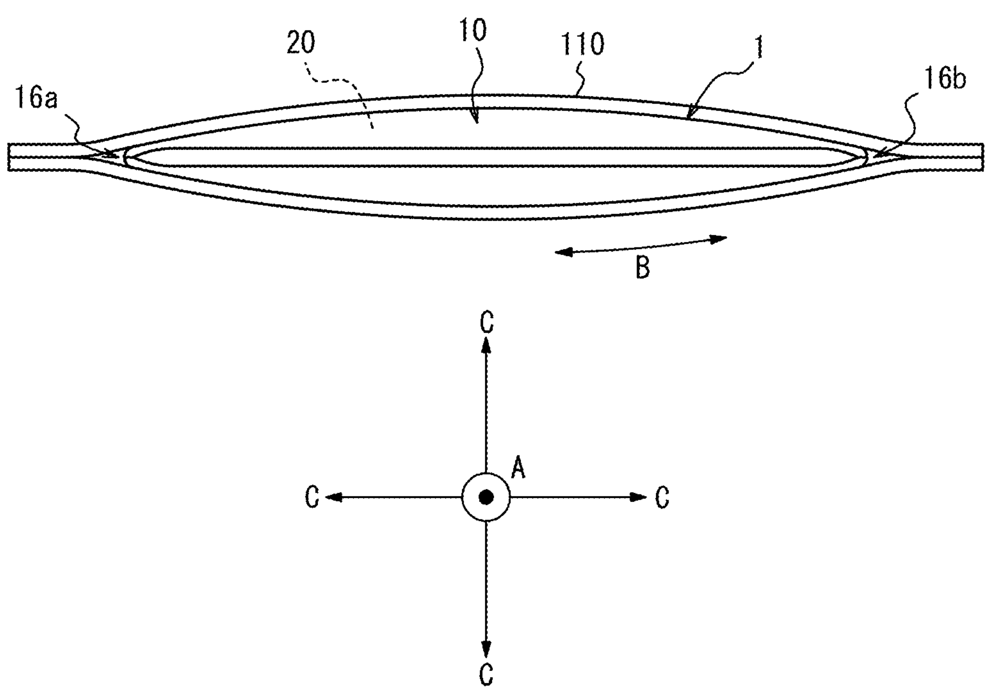
FIG. 6B is a drawing illustrating a state where the sound absorbing tool illustrated in FIG. 6A is further compressed to be packed by a packing material.

The following describes the transportability of the sound absorbing tool 1 of this embodiment, with reference to FIG. 6A and FIG. 6B. FIG. 6A is a drawing illustrating a state where the sound absorbing tool 1 of this embodiment is folded to be flattened at the positions of the connecting portions 16 of the housing body 10. FIG. 6B is a drawing illustrating a state where the sound absorbing tool 1 illustrated in FIG. 6A is further compressed to be packed by a packing material.

As described above, the housing body 10 of the sound absorbing tool 1 is configured to be stretchable in the first circumferential direction B. Moreover, the sound absorbing material 20 housed in the housing space 10*a* of the housing body 10 is shapeless and thus likely to deform following the deformation of the housing body 10. Therefore, as illustrated in FIG. 6A and FIG. 6B, the sound absorbing tool 1 is depressed from the outside C1 toward the inside C2 in the radial direction C, which flattens the housing body 10 and compresses the sound absorbing material 20, thus easily flattening the sound absorbing tool 1. Therefore, when the sound absorbing tool 1 is transported alone, the sound absorbing tool 1 can be compactified to increase the transportability.

In particular, in the sound absorbing tool 1 of this embodiment, as described above, in a state where the sound absorbing material 20 is housed in the housing space 10*a* of the housing portion 15, the bending rigidity in the thickness direction E of the connecting portion 16 of the housing body 10 is smaller than the bending rigidity in the thickness direction E of the housing portion 15 of the housing body 10. Furthermore, in the sound absorbing tool 1 of this embodiment, in a state where the sound absorbing material 20 is housed in the housing space 10*a* of the housing portion 15, a maximum thickness T1 of the connecting portion 16 is thinner than a maximum thickness T2 of the housing portion 15. In a case of such a connecting portion 16, the housing body 10 preferably includes a first connecting portion 16*a* and a second connecting portion 16*b* provided at the positions to be both ends of the flat length L2. This makes the sound absorbing tool 1 be likely to be flattened such that the first connecting portion 16*a* and the second connecting portion 16*b* are both ends of the flat length L2, without substantially receiving the restoring force of the sound absorbing material 20, as illustrated in FIG. 6A.

From the state illustrated in FIG. 6A, by further compressing the sound absorbing material 20 of the housing space 10*a*, the sound absorbing tool 1 may be further flattened as illustrated in FIG. 6B. As illustrated in FIG. 6B, by vacuum-packing the sound absorbing tool 1 by a packing material 110 in a state where the sound absorbing material 20 is compressed, the sound absorbing tool 1 can be more compactified. This can further increase the transportability of the sound absorbing tool 1.

[Assembly 300]

Figure 7A:
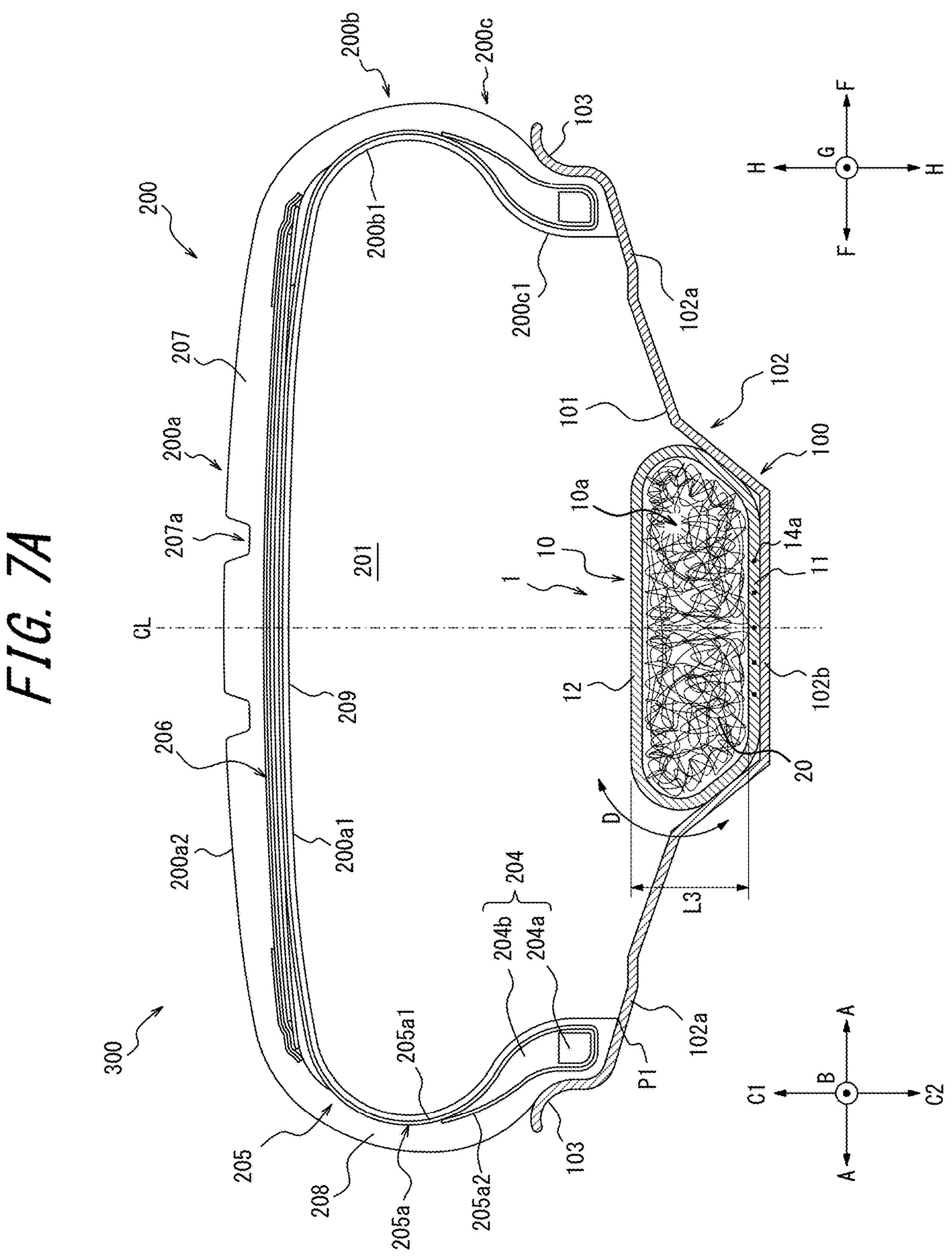
FIG. 7A is a cross-sectional view in a tire width direction during non-rotation when an assembly as one of the embodiments is not rotating in a tire circumferential direction.
Figure 7B:
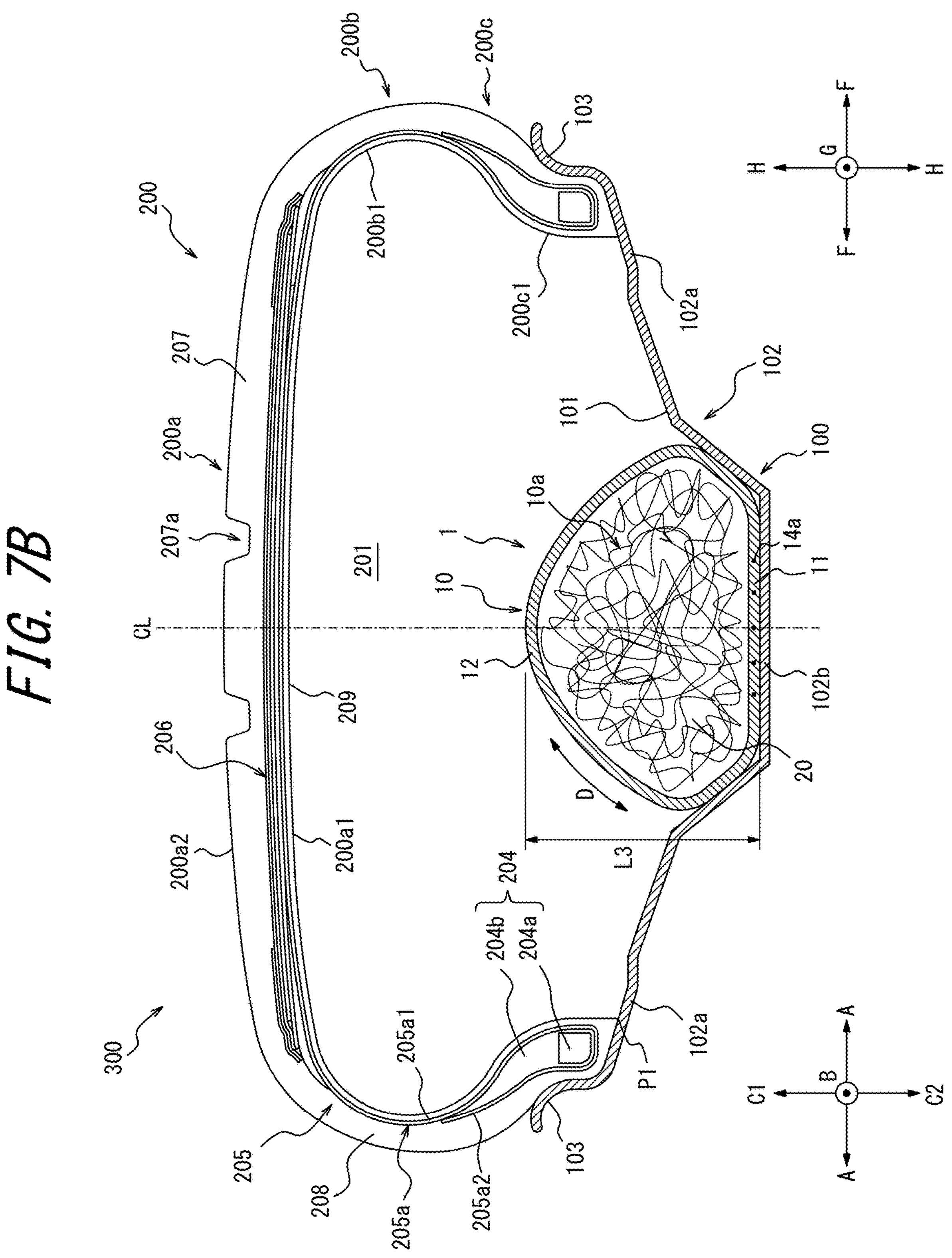
FIG. 7B is a cross-sectional view in the tire width direction during rotation when the assembly illustrated in FIG. 7A is rotating in the tire circumferential direction.

The following describes an assembly 300 as one of the embodiments, with reference to FIG. 7A and FIG. 7B. The assembly 300 of this embodiment includes a tire 200, in addition to the above sound absorbing tool 1 (see FIG. 1 to FIG. 4, etc.) and rim 100 (see FIG. 5). FIG. 7A and FIG. 7B are each a cross-sectional view in the tire width direction illustrating a cross-sectional surface through the tire rotation axis and along the tire width direction, of the assembly 300. FIG. 7A is a cross-sectional view in the tire width direction of the assembly 300, during non-rotation when the assembly 300 is not rotating in the tire circumferential direction. In contrast, FIG. 7B is a cross-sectional view in the tire width direction of the assembly 300, during rotation when the assembly 300 is rotating in the tire circumferential direction. As illustrated in FIG. 7A and FIG. 7B, in a cross-sectional view in the tire width direction of the assembly 300, the cross-sectional surface of the sound absorbing tool 1 is a cross-sectional surface orthogonal to the first circumferential direction B. Hereinafter, the width direction of the tire 200 in the assembly 300 is referred to as a "tire width direction F". The direction around the central axis of the tire 200 in the assembly 300 is referred to as a "tire circumferential direction G". Furthermore, the radial direction of a circle around the central axis of the tire 200 in the assembly 300 is referred to as a "tire radial direction H".

As illustrated in FIG. 7A and FIG. 7B, the rim 100 includes: the annular portion 102 including the annular outer surface 101; and the rim flange portions 103, as described above. The annular portion 102 includes: a pair of bead sheet portions 102*a* located at both ends in the tire width direction F; and a well portion 102*b* placed between the pair of bead sheet portions 102*a* in the tire width direction F and recessed inside the bead sheet portions 102*a* in the tire radial direction H. The rim flange portion 103 protrudes from the outside end in the tire width direction F of the bead sheet portion 102*a* of the annular portion 102 toward the outside in the tire radial direction H.

The "rim" herein is an approved rim ("Measuring Rim" in The European Tyre and Rim Technical Organisation (ETRTO) STANDARDS MANUAL, "Design Rim" in The Tire and Rim Association, Inc. (TRA) YEAR BOOK) in applicable size described or to be described in future in an effective industrial standard in areas where tires are produced or used, such as Japan Automobile Tyre Manufacturers Association (JATMA) YEAR BOOK in Japan, ETRTO STANDARDS MANUAL in Europe, or TRA YEAR BOOK in the United States. In the case of a size that is not described in such industrial standard, the rim refers to a rim having a width corresponding to a bead width of the tire. The "rim" includes sizes that can be described in future in the above industrial standard, in addition to the current sizes. Examples of "the size to be described in future" include sizes described as "FUTURE DEVELOPMENTS" in 2013 edition of ETRTO STANDARDS MANUAL.

The following describes the tire 200. As illustrated in FIG. 7A and FIG. 7B, the tire 200 is mounted on the rim 100. Hereinafter, unless otherwise noted, the dimensions, length relationships, the positional relationships, etc. of respective components will be measured in a reference state where a pneumatic tire as the tire 200 is mounted on the rim 100 and filled with a prescribed internal pressure to have no load. The "prescribed internal pressure" indicates an air pressure (maximum air pressure) corresponding to a maximum load capability of a single wheel in an applicable size and ply rating described in JATMA YEAR BOOK or the like as described above. In the case of a size that is not described in the above industrial standard, the "prescribed internal pressure" refers to an air pressure (maximum air pressure) corresponding to the maximum load capability prescribed for each vehicle on which the tire is mounted. Furthermore, the "maximum load" indicates a load corresponding to the above tire maximum load capability of the standard of JATMA or the like in the tire of the applicable size, or the maximum load having a size that is not described in the above industrial standard indicates a load corresponding to the maximum load capability prescribed for each vehicle on which the tire is mounted.

The tire 200 of this embodiment is a passenger vehicle tire but may be, for example, a tire for truck and bus. The type, application, and the like of the vehicle to be applied are not specifically limited.

As illustrated in FIG. 7A and FIG. 7B, the tire 200 includes: a tread portion 200*a*; a pair of sidewall portions 200*b* extending from both ends in the tire width direction F of the tread portion 200*a* to the inside in the tire radial direction H; and a pair of bead portions 200*c* each provided at the end inside in the tire radial direction H of each sidewall portion 200*b*. The tire 200 of this embodiment is a tubeless-type radial tire.

The tire 200 has a tire lumen 201 defined by a tread inner surface 200*a*1 that is the inner surface of the tread portion 200*a*; sidewall inner surfaces 200*b*1 that are the inner surfaces of the sidewall portions 200*b*; and bead inner surfaces 200*cl* that are the inner surfaces of the bead portions 200*c*.

The tire 200 includes a bead member 204, a carcass 205, a belt 206, a tread rubber 207, a side rubber 208, and an inner liner 209.

The bead member 204 is buried in the bead portion 200*c*. The bead member 204 includes a bead core 204*a* and a rubber bead filler 204*b* located outside in the tire radial direction H with respect to the bead core 204*a*. The bead core 204*a* includes a plurality of bead wires surrounded by rubber coating. The bead wire may be formed of, for example, a steel cord. The steel cord can be made of, for example, steel monofilaments or stranded wires. For example, organic fibers, carbon fibers, or the like may be used as the bead wire.

The carcass 205 straddles between the pair of bead portions 200*c*, more specifically, between the bead cores 204*a* of the pair of bead members 204 and extends in a toroidal shape. More specifically, the carcass 205 of this embodiment includes one or more (one in this embodiment) carcass plies 205*a* in which carcass cords are arranged at an angle of, for example, 75° to 90° with respect to the tire circumferential direction G. The carcass ply 205*a* includes: a ply main body 205*a*1 located between the pair of bead cores 204*a*; and ply folded portions 205*a*2 that are folded from the inside to the outside in the tire width direction F around the bead cores 204*a* at both ends of the ply main body 205*a*1. The bead filler 204*b* that extends in a tapered shape from the bead core 204*a* to the outside in the tire radial direction H is arranged between the ply main body 205*a*1 and the ply folded portion 205*a*2. The carcass cords that form the carcass ply 205*a* may be, for example, metal cords such as steel cords or may be organic fiber cords such as nylon. The carcass 205 may include a plurality of carcass plies 205*a*.

The belt 206 includes one or more (five in this embodiment) belt layers arranged outside in the tire radial direction H with respect to the crown portion of the carcass 205. Each belt layer may be an inclined belt layer with an angle of 10° or more with respect to the tire circumferential direction G of the belt cord or may be a circumferential belt layer with an angle of less than 10° with respect to the tire circumferential direction G of the belt cord.

The tread rubber 207 forms a tread outer surface 200*a*2 that is the outer surface of the tread portion 200*a*. On the tread outer surface 200*a*2, a tread pattern including a circumferential groove 207*a* extending in the tire circumferential direction G and a width direction groove (not illustrated) extending in the tire width direction F, and the like is formed. The side rubber 208 forms the outside surface in the tire width direction F of the sidewall portion 200*b* and are continuous with the end in the tire width direction F of the above tread rubber 207.

The inner liner 209 is stacked on the inner surface of the carcass 205. The inner liner 209 may be formed of, for example, a butyl-based rubber with low air permeability.

As illustrated in FIG. 7A and FIG. 7B, the sound absorbing tool 1 is supported by the rim 100, on the annular outer surface 101 of the rim 100, inside the tire 200. More specifically, in the assembly 300 of this embodiment, the sound absorbing tool 1 is placed on the annular outer surface 101 at the position of the well portion 102*b* of the annular portion 102.

As illustrated in FIG. 7A and FIG. 7B, the sound absorbing tool 1 is wound around the rim 100 such that the inner wall 11 of the housing body 10 faces the inside in the tire radial direction H to be in contact with the annular outer surface 101. In other words, the sound absorbing tool 1 is wound around the rim 100 such that the outer wall 12 of the housing body 10 faces the outside in the tire radial direction H to be opposed to the tread inner surface 200*a*1 of the tire 200.

During non-rotation when the assembly 300 is not rotating in the tire circumferential direction G (see FIG. 7A), no centrifugal force acts on the sound absorbing tool 1 to the outside in the tire radial direction H (same as the outside C1 in the radial direction C). In contrast, during rotation when the assembly 300 is rotating in the tire circumferential direction G (see FIG. 7B), the centrifugal force acts on the sound absorbing tool 1 to the outside in the tire radial direction H (same as the outside C1 in the radial direction C). Therefore, as illustrated in FIG. 7B, the housing body 10 of the sound absorbing tool 1 elongates in the first circumferential direction B and the second circumferential direction D due to the above centrifugal force during the rotation of the assembly 300 to expand the housing space 10*a*. This also increases the volume of the sound absorbing material 20 of the housing space 10*a*.

Therefore, the sound absorbing tool 1 can decrease a height L3 in the tire radial direction H during the non-rotation of the assembly 300 (see FIG. 7A). This makes the sound absorbing tool 1 be less likely to be an obstacle when the tire 200 is mounted on the rim 100.

In contrast, the sound absorbing tool 1 increases its volume to increase the height L3 in the tire radial direction H during the rotation of the assembly 300 (see FIG. 7B). This is because the housing body 10 elongates in the second circumferential direction D due to the centrifugal force. This also increases the volume of the sound absorbing material 20 of the housing space 10*a* to increase air gaps in the sound absorbing material 20, which increases the sound absorbing performance. Moreover, the volume of the sound absorbing tool 1 increases during the rotation of the assembly 300 (see FIG. 7B), which accordingly decreases the cavity of the tire lumen 201. That is, the decrease in the cavity in which the resonance sound is generated can restrain the generated resonance sound itself.

That is, the sound absorbing tool 1 can achieve a balance of the increase in mountability when the tire 200 is attached to and mounted on the rim 100 and the increase in sound absorbability during vehicle running with the assembly 300 rotating.

As illustrated in FIG. 7A, the outside end in the tire radial direction H of the sound absorbing tool 1 of the assembly 300 of this embodiment is located inside in the tire radial direction H with respect to an inside end P1 in the tire radial direction H of the tire 200 during the non-rotation of the assembly 300. In contrast, as illustrated in FIG. 7B, the outside end in the tire radial direction H of the sound absorbing tool 1 of the assembly 300 of this embodiment is located outside in the tire radial direction H with respect to the inside end P1 in the tire radial direction H of the tire 200 during the rotation of the assembly 300. That is, the rotation of the assembly 300 causes the sound absorbing tool 1 to expand from the inside to the outside in the tire radial direction H so as to cross the position in the tire radial direction H of the inside end P1 in the tire radial direction H of the tire 200. In this embodiment, "the outside end in the tire radial direction H of the sound absorbing tool 1" is a part of the outer wall 12 of the housing body 10. This facilitates the achievement of the above balance of the mounting performance and the sound absorbing performance.

Figure 8:
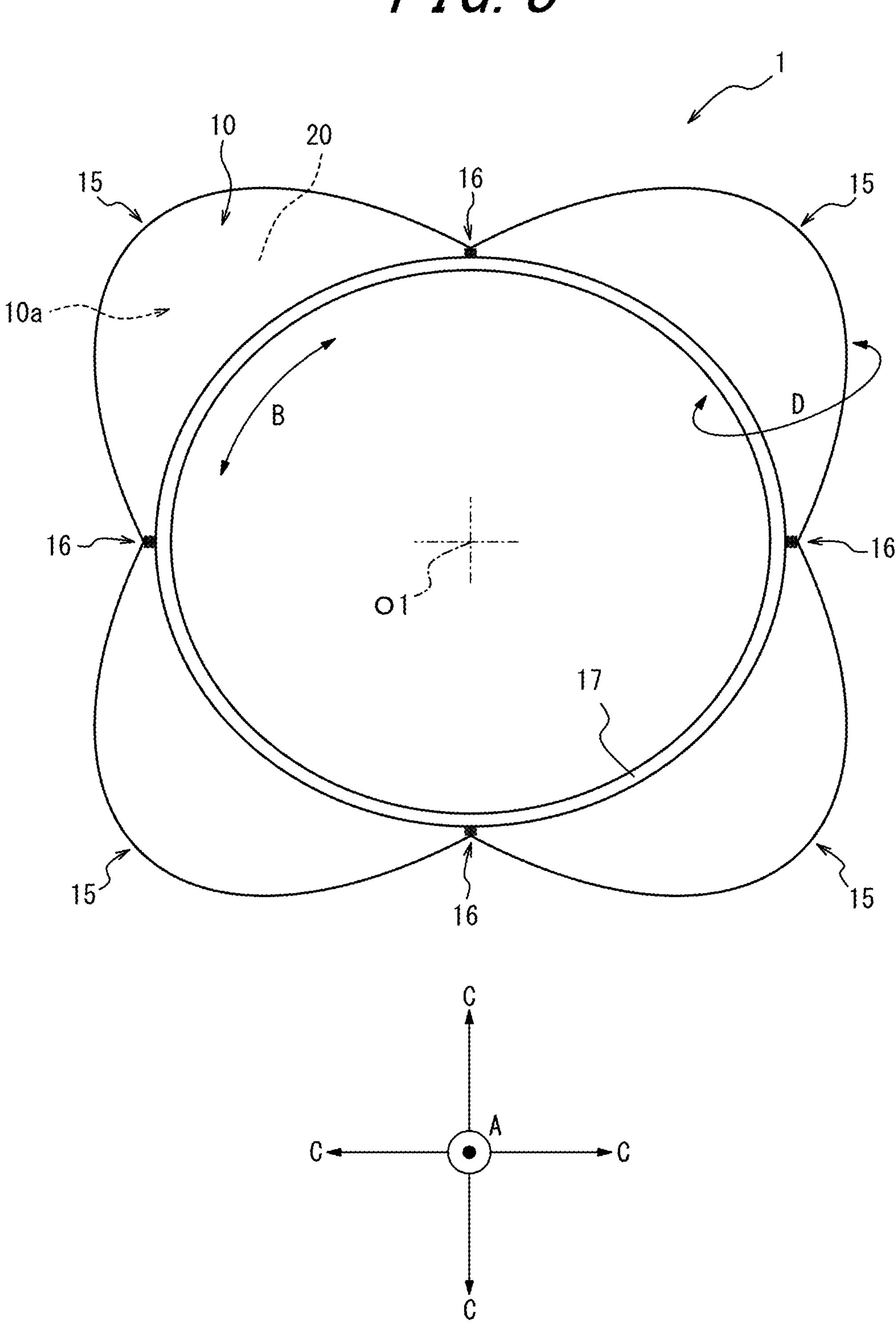
FIG. 8 is a drawing illustrating a variant of the sound absorbing tool illustrated in FIG. 1.

The sound absorbing tool and the assembly according to this disclosure are not limited to the specific configurations described in the above embodiments, and various variants, changes, and combinations are possible without departing from the claims. The above sound absorbing tool 1 has a configuration including two housing portions 15 and two connecting portions 16 in the first circumferential direction B. However, as illustrated in FIG. 8, the sound absorbing tool 1 may have a configuration including three or more (four in FIG. 8) housing portions 15 and three or more (four in FIG. 8) connecting portions 16 in the first circumferential direction B. The above housing body 10 has a configuration in which the inner wall 11 includes the reinforcing fibers 13*a* and 14*a*. However, as illustrated in FIG. 8, the housing body 10 may have a configuration in which the inner wall 11 includes a reinforcing film 17 as at least one of the first inside reinforcing member 13 and the second inside reinforcing member 14.

INDUSTRIAL APPLICABILITY

This disclosure relates to a sound absorbing tool and an assembly.

REFERENCE SIGNS LIST

1 sound absorbing tool
10 housing body
10*a* housing space
11 inner wall
12 outer wall
13 first inside reinforcing member
13*a* reinforcing fibers
14 second inside reinforcing member
14*a* reinforcing fibers
15 housing portion
16 connecting portion
16*a* first connecting portion
16*b* second connecting portion
17 reinforcing film
20 sound absorbing material
100 rim
101 annular outer surface
102 annular portion
102*a* bead sheet portion
102*b* well portion
103 rim flange portion
110 packing material
200 tire
200*a* tread portion
200*a*1 tread inner surface
200*a*2 tread outer surface
200*b* sidewall portion
200*b*1 sidewall inner surface
200*c* bead portion
200*c*1 bead inner surface
201 tire lumen
204 bead member
204*a* bead core
204*b* bead filler
205 carcass
205*a* carcass ply
205*a*1 ply main body
205*a*2 ply folded portion
206 belt
207 tread rubber
207*a* circumferential groove
208 side rubber
209 inner liner
300 assembly
A width direction of the sound absorbing tool
B first circumferential direction of the sound absorbing tool
C radial direction of the sound absorbing tool
C1 outside in the radial direction of the sound absorbing tool
C2 inside in the radial direction of the sound absorbing tool
D second circumferential direction of the sound absorbing tool (direction around the endless axis)
E thickness direction of the sound absorbing tool
F tire width direction
G tire circumferential direction
H tire radial direction
L2 flat length of the sound absorbing tool
L3 height in the tire radial direction of the sound absorbing tool
O1 central axis of the housing body
O2 endless axis along the first circumferential direction
P1 inside end in the tire radial direction of the tire
T1 maximum thickness of the connecting portion
T2 maximum thickness of the housing portion

The invention claimed is:

1. A sound absorbing tool comprising:
an endless housing body that internally defines a housing space and is stretchable in a first circumferential direction; and
a shapeless sound absorbing material that is housed in the housing space of the housing body,
wherein the housing body includes an inner wall that defines a radially inner boundary of the housing space and an outer wall that defines a radially outer boundary of the housing space, and
wherein the inner wall internally includes reinforcing fibers that extend in the first circumferential direction, and the outer wall internally includes no reinforcing fibers that extend in the first circumferential direction, such that the inner wall has lower stretchability in the first circumferential direction than the outer wall.

2. The sound absorbing tool according to claim 1, wherein the housing body is stretchable in a second circumferential direction which is a direction around an endless axis extending along the first circumferential direction.

3. The sound absorbing tool according to claim 2, wherein the inner wall internally includes reinforcing fibers that extend in the second circumferential direction, and the outer wall internally includes no reinforcing fibers that extend in the second circumferential direction, such that the inner wall has lower stretchability in the second circumferential direction than the outer wall.

4. The sound absorbing tool according to claim 1, wherein the housing body is a woven fabric or a knitted fabric.

5. The sound absorbing tool according to claim 1, wherein the sound absorbing material is a shapeless stuffing including linear or granular pieces.

6. The sound absorbing tool according to claim 1, wherein the housing body includes, in the first circumferential direction:
a plurality of housing portions that define the housing space; and
a plurality of connecting portions that are located between the plurality of housing portions and define no housing space, and
the plurality of connecting portions include a first connecting portion and a second connecting portion that are provided at positions of both ends of a width of the housing body when the housing body is flattened.

7. An assembly comprising a rim and a tire mounted on the rim, the assembly comprising the sound absorbing tool according to claim 1 that is supported by the rim on an annular outer surface of the rim, inside the tire.

8. The sound absorbing tool according to claim 2, wherein the housing body is a woven fabric or a knitted fabric.

9. The sound absorbing tool according to claim 2, wherein the sound absorbing material is shapeless stuffing including linear or granular pieces.

10. The sound absorbing tool according to claim 2, wherein the housing body includes, in the first circumferential direction:
a plurality of housing portions that define the housing space; and a plurality of connecting portions that are located between the plurality of housing portions and define no housing space, and the plurality of connecting portions include a first connecting portion and a second connecting portion that are provided at positions of both ends of a width of the housing body when the housing body is flattened.

11. An assembly comprising a rim and a tire mounted on the rim, the assembly comprising the sound absorbing tool according to claim 2 that is supported by the rim on an annular outer surface of the rim, inside the tire.

12. The sound absorbing tool according to claim 3, wherein the housing body is a woven fabric or a knitted fabric.

13. The sound absorbing tool according to claim 3, wherein the sound absorbing material is a shapeless stuffing including linear or granular small pieces.

14. The sound absorbing tool according to claim 3, wherein the housing body includes, in the first circumferential direction:

a plurality of housing portions that define the housing space; and a plurality of connecting portions that are located between the plurality of housing portions and define no housing space, and the plurality of connecting portions include a first connecting portion and a second connecting portion that are provided at positions of both ends of a width of the housing body when the housing body is flattened.

15. An assembly comprising a rim and a tire mounted on the rim, the assembly comprising the sound absorbing tool according to claim 3 that is supported by the rim on an annular outer surface of the rim, inside the tire.

* * * * *